Nov. 17, 1936.　　　　R. B. LEWIS　　　　2,061,383
STRESS-STRAIN RECORDING INSTRUMENT
Filed March 10, 1934　　2 Sheets-Sheet 1

INVENTOR
ROBERT B. LEWIS
BY
Robert M. Barr
ATTORNEY

Nov. 17, 1936.  R. B. LEWIS  2,061,383
STRESS-STRAIN RECORDING INSTRUMENT
Filed March 10, 1934  2 Sheets-Sheet 2

INVENTOR
Robert B. Lewis
BY
ATTORNEY

Patented Nov. 17, 1936

2,061,383

UNITED STATES PATENT OFFICE 2,061,383

STRESS-STRAIN RECORDING INSTRUMENT

Robert B. Lewis, Philadelphia, Pa., assignor to Tinius Olsen Testing Machine Company, Philadelphia, Pa., a corporation of Pennsylvania Application March 10, 1934, Serial No. 714,948

8 Claims. (Cl. 265—2)

The present invention relates to apparatus for making stress-strain records of a specimen subjected to stress in a testing machine, and more particularly to the recording of the structural behavior of a specimen subjected to tension or compression.

Recording instruments of this general character are usually operated electrically by tracing a record of the behavior of a specimen under test upon a record sheet carried by a movable drum which is driven by a succession of electrical impulses initiated by variations of the specimen dimension brought about by the testing operation. The difficulty in translating test specimen variations through such electrical impulses is that heretofore it has not been found possible to provide positive synchronization of the electrically responsive devices with the initiating control means. As a result an initiating impulse may be so feeble as to fail to operate the responsive device or if strong enough to start the responsive device it may be interrupted so that the responsive device cannot complete the record for which it was started.

Some of the objects of the present invention are to provide an improved recording apparatus for use with testing instruments and machines; to provide an electrical control for a recording apparatus wherein each initiated cycle of operation is completed in full regardless of any variation or change in the initiating mechanism during such cycle; to provide means for accurately recording the behavior of a specimen under test and making the records under uniform conditions; to provide means associated with an electric initiating mechanism wherein a predetermined rotation of the drum of a novel recording device will be made for each electrical impulse; to provide an initiating apparatus for recording devices wherein the apparatus automatically sets itself in response to a specimen test before the control for the recording mechanism starts to operate and whereby thereafter it is impossible to alter the set condition of the apparatus until the completion of the particular recording operation corresponding to that set position of the initiating apparatus; and to provide other improvements as will hereinafter appear.

Figure 1:
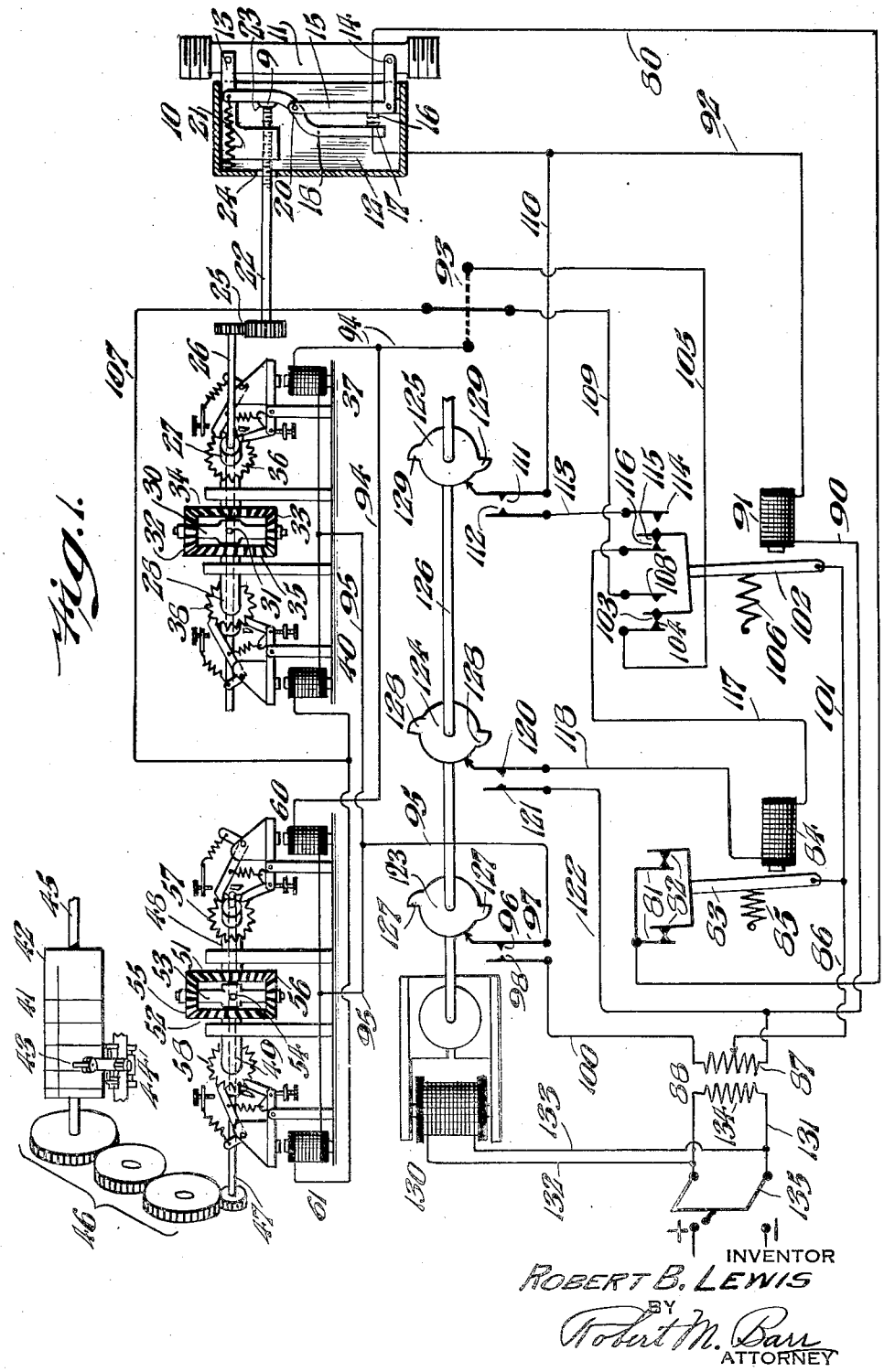
Figure 2:
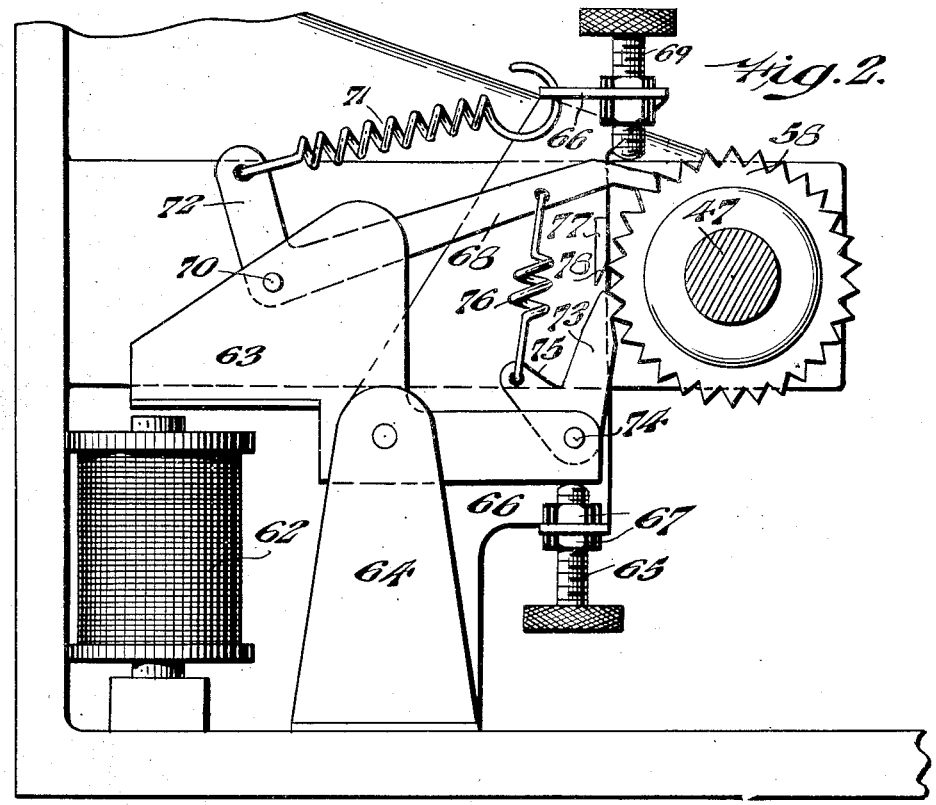
Figure 3:
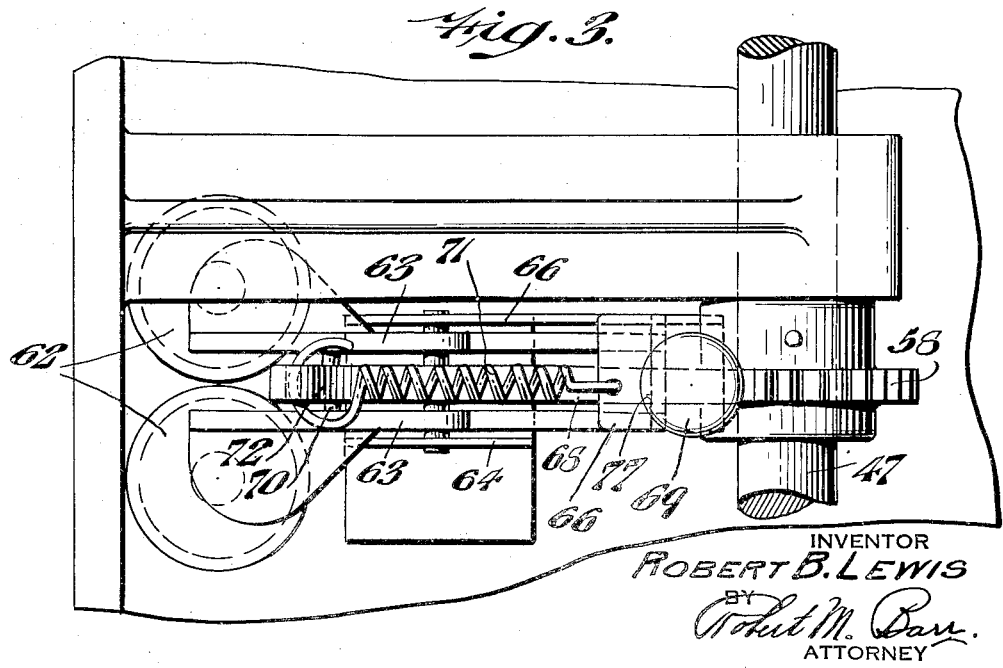

In the accompanying drawings Fig. 1 represents diagrammatically a recording apparatus embodying one form of the present invention; Fig. 2 represents a detail in side elevation of an intermittent mechanism employed in conjunction with a magnetic control for carrying out certain movements; and Fig. 3 represents a plan of the same.

Referring to the drawings one form of the present invention is shown as applied for use with an extensometer 10 which is mounted in test position upon a specimen 11 and is adapted to respond to the behavior of the specimen under tension or compression tests. While any type of extensometer embodying terminal contacts of an electrical circuit can be used with the apparatus of the present invention it is preferred to use that here shown which generally consists of an L-shaped body 12 having a clamp 13 for fixedly engaging the specimen at one point and a second clamp 14 formed as a part of a pivoted lever 15 for engaging the specimen at another point. The lever 15 carries a contact 16 forming one terminal of an electric circuit, while the other terminal is in the form of a contactor 17 carried by an arm 18 which is freely suspended intermediate its length upon a pivot 20 on the lever 15. A spring 21 is stretched between the free end of the lever 18 and a fixed point and functions to draw the contactor 17 toward the contact 16. A control push or pull shaft 22 is attached at 23 to the arm 18 and is threaded through the body 12 so that according to the direction of its rotation it will move to restore the arm 18 to its normal position. Normally the end of the shaft rests against a lug 9 on the lever 18 between the pivot 20 and the place of attachment of the spring 21, and this bearing point acts as a fulcrum about which the lever 18 turns when moved by the lever 15. Thus under tension tests the movement of the shaft 22 will be in the direction to open the contacts 16 and 17 while under compression tests the movement will be in the opposite direction to close the contacts 16 and 17. In other words the shaft 22 serves to restore the initiating control to its normal position immediately following a tension or compression setting thereof. In effect this is a micrometer adjustment operating to close the contacts if the device is operating on closed circuit, and to open the contact if the device is operating on open circuit.

For operating this adjustment or restoring means the shaft 22 preferably receives its motion through a reducing gearing 25 from a driven shaft 26. As here shown the shaft 26 rotatably supports two sleeves 27 and 28 in spaced relation to receive between them a trunnion 30 which is made fast to the shaft 26 by a pin 31 or like fastening means. Journalled respectively upon two opposite ends of the trunnion 30 are two bevel gears 32 and 33 which are in mesh on one side with a bevel gear 34 fast to the sleeve 27, and on the other side with a bevel gear 35 fast to the sleeve 28. Motion is transmitted to the sleeve 27 by a step-by-step mechanism including a ratchet 36 keyed to the said sleeve 27, which mechanism is under the control of a motor 37. Motion is transmitted to the sleeve 28, in a direction opposite to that of the sleeve 27, by a step-by-step mechanism including a ratchet 38 keyed to the sleeve 28, which mechanism is under the control of a motor 40.

For recording the variations in length of the test specimen as transmitted through the control mechanism, a recorder 41 of any well known type using a rotatable drum 42 and a pencil or stylus 43 can be used and wherein the pencil 43 is arranged to travel lengthwise of the drum by means of a carriage 44 traveling at a rate accurately proportioned to the stress imposed by the testing machine. As here shown the drum shaft 45 is driven through a gear train 46 from a driven shaft 47 which serves as a journal for two sleeves 48 and 49 carrying respectively two bevel gears 51 and 52 in opposed relation and spaced by a trunnion 53 fastened by a pin 54 to the shaft 47. Two opposite ends of the trunnion 53 respectively journal bevel gears 55 and 56 meshing respectively with the gears 51 and 52 to form an epicyclic form of gearing. The sleeve 48 has keyed, or otherwise secured thereto, a ratchet 57 arranged to drive the shaft 47 in one direction, while the sleeve 49 has a ratchet 58 keyed thereto to drive the shaft 47 in the reverse direction. The two ratchets 57 and 58 are respectively actuated by step-by-step mechanism driven in the one instance by a motor 60, and in the other instance by a motor 61.

In the present instance all of the motors 37, 40, 60 and 61 are of the same construction embodying a novel escapement and therefore the description will be directed to the details of one motor as shown in Figs. 2 and 3 and like parts of the other three motors will be identified by like reference numerals. Each motor therefore consists of a pair of electro-magnets 62 with which is associated an armature 63 pivotally carried by a fixed post 64 at a point intermediate the armature length. The rearward projection of the armature 63 is arranged to be engaged by an abutment screw 65 which has the dual function of a positioning stop for the armature and also of adjusting the airgap between the magnet pole and the armature. The screw 65 is supported by an extension bracket 66 and can be adjusted and locked by nuts 67. The bracket 66 also mounts a second adjusting screw 69 which acts as a stop for a pawl 68 during a movement of the latter to move the ratchet 58. This pawl 68 is pivoted at 70 to the armature 63 and is normally held pressed downwardly against the upper face of a tooth of the ratchet 58 by means of a spring 71 stretched between the offset arm 72 of the pawl 68 and a fixed part, such as the bracket 66. A second ratchet operating pawl 73 is pivoted at 74 to the opposite end of the armature 63 from the pawl 68 and in operating position engages the ratchet 58 several teeth removed from the point of engagement of the pawl 68. An arm 75 of the pawl 73 is connected by a spring 76 stretched to connect with the pawl 68 at such a position as will draw the pawl 68 toward the pawl 73 whenever it passes beyond the end of a ratchet tooth. Whenever the magnets 62 are energized the armature 63 will have a limited movement in a counter-clockwise direction which will cause the pawl 73 to have a work stroke of a length to turn the ratchet 58 approximately one half a tooth. Simultaneously with this movement there is a drawing back of the pawl 68 until it clears the then supporting ratchet tooth whereupon it drops to the next tooth so that when the magnets 62 are deenergized the return movement of the armature 63, under the pull of the spring 71, will cause the pawl 68 to complete the turning of the ratchet through the remaining one half of a tooth. In this connection it should be noted that the stop 69 is adjusted with respect to the pawl 68 to definitely contact therewith at the end of the stroke of pawl 68 to prevent over-running of the ratchet 58 at the end of a movement. Likewise a stop 77 is fixed in the path of the pawl 73 and has an inclined face 78 so disposed as to form a seat against which the pawl 73 abuts when preventing an over-run at the end of each step movement. This construction serves as a locking means whereby the ratchet 58 cannot over-run after being actuated by reciprocation of the armature 63.

When the extensometer 10 is set to respond to a tension test the contact 16 and contactor 17 are normally apart so that the initiating circuit is open and is ineffective to influence the recording and restoring mechanisms until this circuit is closed. This initiating circuit includes a conductor 80 from contact 16 to a contact 81 controlled by a contactor 82 carried by the pivoted armature 83 of a relay 84. With the relay deenergized a spring 85 maintains the armature 83 in contact making position so that the aforesaid circuit continues by conductor 86, secondary 87 of a step down transformer 88, conductor 90, the coil of a second relay magnet 91, and thence by conductor 92 to contactor 17. Under tension test conditions the two motors 40 and 61 are arranged to operate in synchronism and are selected for operation by manually throwing a reverse switch 93 to the full line position shown in Fig. 1. The motors 40 and 61 being connected in parallel are controlled by the following circuit: Switch 93, conductor 107, through the windings of the two motors 40 and 61 to common return conductor 95 leading to contactor 96 on movable spring 97, contact 98, conductor 100, secondary coil 87 to conductors 86 and 101 to armature lever 102 of relay 91 to contactor 103, contact 108, and conductor 109 back to the switch 93. The foregoing circuit is directly controlled by the terminals 96 and 98 and indirectly or selectively controlled by the terminals 103 and 108 depending upon whether the relay 91 is energized or deenergized. A spring 106 is stretched to retract the lever 102 when the relay magnet 91 is deenergized and thereby make the contact between contactor 103 and the contact 104.

When the extensometer 10 is to function under compression tests the contact between the terminals 16 and 17 of the initiating circuit is normally closed and the initiating circuit therefore controls only when open. The recording and restoring mechanisms are now operated in a reverse direction to that for a tension test and the two motors 37 and 60 are in control by reason of the switch 93 having been manually moved to the dotted line position. The circuit from switch 93 now leads by conductor 94 to the two motors 37 and 60 and thence by conductor 95 to the control contactor 97 and continues as before through the armature lever 102 to the contactor 103. At this point since the initiating circuit is open under compression of the test piece the contactor 103 is against the contact 104 so that the circuit is completed by conductor 105 to the switch 93.

For the purpose of preventing any interference by the initiating circuit with a set condition of the control circuit during a compression test, provision is made for short circuiting the contact 16 and contactor 17 to close the initiating circuit until the set condition has completed its recording operation, and to that end a conductor 110 leads from the conductor 92 to a spring arm contactor 111 arranged in opposed relation to a fixed contact 112 which is joined by a conductor 113 to a contact 114. This contact 114 is located to be engaged by a contactor 115 carried by the armature lever 102 when the latter is shifted by the energization of relay 91. At that time the circuit is completed through the armature lever 102 and a connecting wire 101 to the conductor 86. This forms a shunt across the contacts 16 and 17 of the initiating circuit and will cause the mechanism to continue to operate if the initiating contacts separate while the periodically closed contacts 111 and 112 are closed. As soon, however, as the cycle is finished and contacts 111 and 112 separate, the circuit will be broken and the relay will release the armature so that the circuit can only be energized further by the initiating contacts and not by the subsequent closing of the periodically closed contacts 111 and 112.

To prevent the opposite condition from occurring and thus starting the mechanism during a cycle, instead of at the beginning thereof, an arrangement is provided whereby, unless the initiating circuit is closed at the beginning of a cycle, it will be broken at an additional point so that the closing of the initiating contacts 16 and 17 cannot start the mechanism before the cycle has been completed. For this purpose a relay has been provided in the initiating circuit, with contacts 81 and 82 and a coil 84 that, when energized, opens the circuit. This coil is in a circuit that extends from the lower side of the transformer secondary 87, through line 122, periodically closed contacts 121 and 120, the coil 84, line 117, contacts 116 and 115 (the latter of which is on the armature 102), and line 101 back to the center tap on the transformer secondary. In operation, when the initiating contacts 16 and 17 are open the armature 102 will be released and moved by a spring 106 into a position in which it will close the contacts 115 and 116. Under this condition when contacts 120 and 121 are closed, as they are during a cycle of the timing mechanism, the coil 84 will be energized and the armature 83 moved to part the contacts 81 and 82 and break the initiating circuit so that the closing of the initiating contacts 16 and 17 can have no effect. On the other hand, if the initiating contacts close between cycles, the contacts 115 and 116 will be parted and the secondary circuit will be out of operation.

In order to simultaneously operate the three control contactors 96, 120 and 111, three cams 123, 124 and 125 are keyed to the same shaft 126 and each has two diametrically located dwells 127, 128 and 129. All of these dwells are preferably alike as to length and radial offset, and are so designed as to permit each controlled circuit to be closed for an appreciable instant so that an operating impulse is assured each time a contact is made. The shaft 126 is continuously rotated at a determined constant speed by a small fractional horse power motor 130 energized directly from the electricity supply line 131 through the conductors 132 and 133. The line 131 supplies current to the primary coil 134 of the transformer 88 while the secondary coil 87 is tapped as explained for different operating voltages. A switch 135 serves to connect the apparatus to the source of current supply.

In describing the operation of the system it will first be assumed that a tension test is to be made and therefore the switch 93 will be manually set to the full line position of Fig. 1. Under such tension test the stress-strain detector or extensometer is set with the contact 16 and contactor 17 spaced apart so that the initiating circuit is normally open and the magnet 91 therefore deenergized in order that the lever arm 102 may be held by its spring 106 in the position shown in Fig. 1 with the contacts 104 and 116 respectively in contact with contactors 103 and 115. When the specimen elongates under the tension test the lever 15 is rocked clockwise so that the movement transmitted to lever 18 causes the contactor 17 to contact with the contact 16 and close the initiating circuit, and as a result the relay magnet 91 is at once energized and the control lever arm 102 is shifted to close contacts 103 and 108 and 115 and 114. As a result the control circuit for the recording and restoring mechanisms is open only at the contacts 96 and 98, while the holding or short-circuiting circuit is open only at the contacts 111 and 112. Since the shaft 126 is rotating continuously at constant speed one of the dwells 127 will almost immediately bring contactor 96 against contact 98 while simultaneously dwell 129 will bring contactor 111 against contact 112. Therefore the restoring circuit which is controlled by the contacts 96 and 98 is closed and an impulse is simultaneously transmitted to the relay motors 40 and 61 and in the one instance makes a record of the test and in the other operates the restoring mechanism so that the shaft 22 rotates in a direction to restore the arm 18 to its normal position with the contact 17 out of contact with the contact 16. At the instant the dwell 127 closes the main control circuit the dwell 129 closes the circuit including contactor 110 so that the extensometer contacts 16 and 17 are short circuited and the magnet 91 remains energized to hold the arm 102 in its position closing the two circuits of which contacts 114 and 108 are respectively the terminals. Therefore when the control circuit is once started in operation nothing that happens to the contacts 16 and 17 can in any way effect the completion of that recording or restoring operation. This is a very important operation in that electric recording mechanisms as heretofore employed have been open to errors due to uncontrolled impulses. Thus, an initiating circuit might be closed for such a fractional time as to transmit such a weak signal that the control circuit would not respond fully enough to make a complete recording though it might start to do so and never finish its operation. By the present invention any operation of the initiating circuit is utilized and insures the control circuit being fully closed to carry out this predetermined function.

At the same time that the dwells 127 and 129 are closing the circuits which each of them control the dwell 128 is closing the contacts 120 and 121, but the circuit in which these contacts are located is open between contactor 115 and contact 116 so that the circuit still remains open and nothing can happen.

When it is desired to make a compression test the extensometer is set with the contact 16 and contactor 17 together so that the initiating circuit is normally closed and the magnet 91 energized so that the lever arm 102 is now held in a position with the contactor 103 against contact 108 and contactor 115 against contact 114. When the specimen diminishes in length the lever 15 is swung counter-clockwise and causes the lever 18 to open the contacts 16 and 17 so that the initiating circuit is deenergized and the arm 102 immediately swings to the position shown in Fig. 1 and the control circuit is now closed except for the open contacts 96 and 98. It should, of course, be understood that the switch 93 has been changed from the full line position of Fig. 1 to the dotted line position and therefore when the dwell 127 closes contacts 96 and 98 the control circuit is closed by way of switch 93 and motor relays 37 and 60 so that the recording mechanism is operated on the one hand and the restoring mechanism operated on the other. In this case, however, the restoring mechanism turns the shaft 22 in the opposite direction so that the spring 21 causes the lever 18 to again close the contacts 16 and 17. Under this compression test, however, the cam 124 is in control of the initiating circuit and at the instant the dwell 127 closes the control circuit the dwell 128 closes the contacts 120 and 121 and thus energizes the magnet 84 so that the arm 83 is shifted to break the contacts 81 and 82. Since these two contacts 81 and 82 are in the initiating circuit the contacts 16 and 17 have no control over the initiating circuit whether they are closed or open since this circuit cannot be completed until the recording and restoring mechanisms have fully operated from the previous impulses.

While only a single form is shown in which this invention may be embodied, it is to be understood that the invention is not limited to any specific construction, but might be applied to various forms without departing from the spirit of the invention or the scope of the appended claims.

Having thus described my invention, I claim:—

1. An indicating mechanism for stress-strain recording that comprises a recorder, driving means for periodically actuating the recorder comprising an electric motor and a means for periodically supplying electric current thereto, a control device responsive to the stress in an object under test for controlling the operation of said driving means, and means for rendering the control device ineffective during and only during the actuating periods.

2. An indicating mechanism for stress-strain recording that comprises a recorder, driving means for periodically actuating the recorder comprising an electric motor and means for periodically supplying electric current thereto, a control device comprising means to break the circuit that supplies current to the electric motor responsive to the stress in an object under test for controlling the operation of said driving means, and means for rendering the control device ineffective during and only during the actuating periods.

3. An indicating mechanism for stress-strain recording that comprises a recorder, driving means for periodically actuating the recorder comprising an electric motor and means for periodically supplying electric current thereto, a control device comprising electrical relay means operated by the closing of control contacts, means to break the circuit that supplies current to the electric motor responsive to the stress in an object under test for controlling the operation of said driving means, and means for rendering the control device ineffective during and only during the actuating periods.

4. An indicating mechanism for stress-strain recording that comprises a recorder, driving means for periodically actuating the recorder comprising an electric motor and means for periodically supplying electric current thereto, a control device comprising electrical relay means operated by the closing of control contacts, means to break the circuit that supplies current to the electric motor responsive to the stress in an object under test for controlling the operation of said driving means, and means for rendering the control device ineffective during and only during the actuating periods, said means comprising an electrical device for forming a shunt around the control contacts during the period of supply of electrical current to the driving means if the control contacts are closed at the beginning of period.

5. An indicating mechanism for stress-strain recording that comprises a recorder, driving means for periodically actuating the recorder comprising an electric motor and means for periodically supply electric current thereto, a control device comprising electrical relay means operated by the closing of control contacts, means to break the circuit that supplies current to the electric motor responsive to the stress in an object under test for controlling the operation of said driving means, and means for rendering the control device ineffective during and only during the actuating periods, said means comprising an electrical device for forming a shunt around the control contacts during the period of supply of electrical current to the driving means if the control contacts are closed at the beginning of period and an electrical device for maintaining a separate break in the circuit containing the control contacts during the period for supplying electricity to the motor except when the control contacts are closed at the beginning of the period.

6. A stress-strain mechanism comprising a strain detecting means arranged to be attached to a test piece, an initiating electric means controlled by said detecting means, a recording instrument, means including a control device responsive to said initiating means for periodically operating the recording instrument, and an apparatus for automatically rendering said initiating means ineffective during periods of operation of said recording instrument.

7. A stress-strain mechanism comprising a strain detecting means arranged to be attached to a test piece, an initiating electric means actuated by said detecting means, a periodically acting device for restoring said initiating means to its original condition following an actuation by said detecting means, means for controlling said restoring device, a recording instrument, both controlling and recording devices being responsive to said initiating means, and an apparatus for rendering said initiating means ineffective during the periods of operation of the recording and restoring devices.

8. A stress-strain mechanism comprising a strain detecting means arranged to be attached to a test piece, an initiating electric means having terminals actuated by said detecting means, a recording instrument, means including a control device responsive to said initiating means for periodically operating the recording instrument, an apparatus for automatically rendering said initiating means ineffective during the periods of operation of said recording instrument, and a device for restoring said terminals to original position following an actuation by said detecting means.

ROBERT B. LEWIS